United States Patent [19]

McMurtry

[11] 4,313,263

[45] Feb. 2, 1982

[54] METHOD AND APPARATUS FOR USE IN CO-ORDINATE MEASURING MACHINES

[75] Inventor: David R. McMurtry, Wotton-Under-Edge, England

[73] Assignees: Rolls Royce Limited; Renishaw Electrical Limited, both of England

[21] Appl. No.: 67,554

[22] Filed: Aug. 17, 1979

Related U.S. Application Data

[62] Division of Ser. No. 872,312, Jan. 25, 1978, Pat. No. 4,168,576.

[30] Foreign Application Priority Data

Feb. 7, 1977 [GB] United Kingdom ............... 5010/77

[51] Int. Cl.³ ........................... G01B 5/03; G01B 7/03
[52] U.S. Cl. ......................................... 33/174 L; 74/826
[58] Field of Search ............... 33/23 K, 169 R, 172 E, 33/174 L, 174 P, 174 PC, 1 D, 174 TD; 74/813 R, 813 L, 816, 817, 826

[56] References Cited

U.S. PATENT DOCUMENTS

| | | | |
|---|---|---|---|
| 2,547,616 | 4/1951 | Beekman | 74/826 |
| 2,908,195 | 10/1959 | Benes | 74/826 |
| 3,091,135 | 5/1963 | Thompson | 74/826 |
| 3,192,628 | 7/1965 | Wroble et al. | 33/174 P |
| 3,449,990 | 6/1969 | Harman | 74/826 |
| 3,509,635 | 5/1970 | Meinke | 33/174 L |
| 3,566,479 | 3/1971 | Pascoe et al. | 33/23 K |

FOREIGN PATENT DOCUMENTS

| | | | |
|---|---|---|---|
| 561412 | 5/1944 | United Kingdom . | |
| 577579 | 5/1946 | United Kingdom . | |
| 678918 | 9/1952 | United Kingdom . | |
| 976330 | 11/1964 | United Kingdom . | |
| 1094067 | 12/1967 | United Kingdom . | |
| 1445977 | 8/1974 | United Kingdom | 33/174 L |

Primary Examiner—Richard R. Stearns
Attorney, Agent, or Firm—Stevens, Davis, Miller & Mosher

[57] ABSTRACT

In a co-ordinate measuring machine a probe is connected to the head of the machine by a pivotal arm, and the orientation of the probe is charged by moving the head so that the arm engages a fixed structure and a moment is applied to the arm which is thereby caused to turn and present the probe in the required orientation.

6 Claims, 7 Drawing Figures

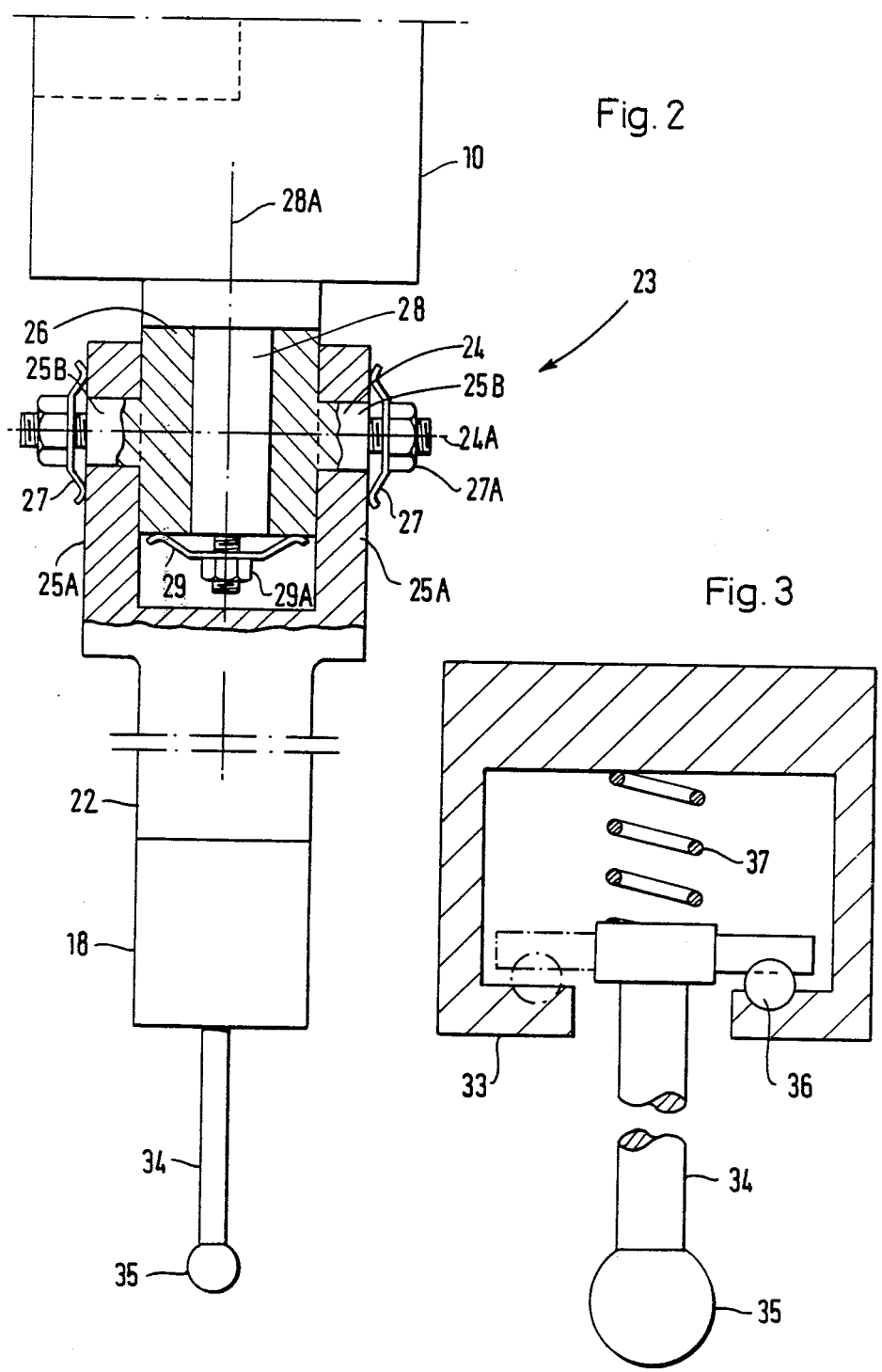

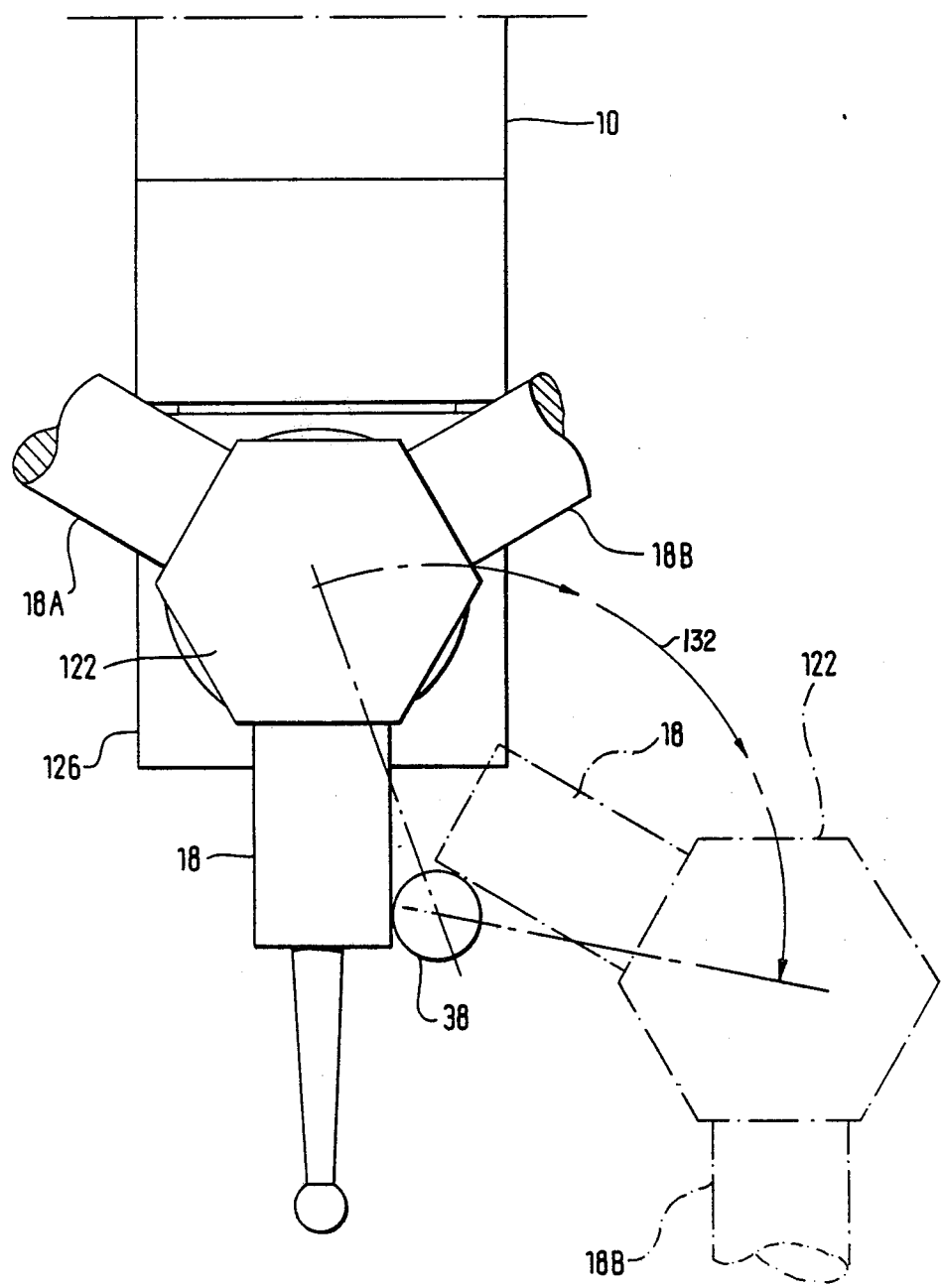

METHOD AND APPARATUS FOR USE IN CO-ORDINATE MEASURING MACHINES

This is a division of application Ser. No. 872,312 filed Jan. 25, 1978 and now U.S. Pat. No. 4,168,576.

This invention relates to a method and apparatus for use in co-ordinate measuring machines.

Co-ordinate measuring machines are known to comprise a head supported for three-dimensional motion relative to fixed structure, the head supporting a probe whereby to engage a workpiece supported on said structure. The workpiece is measured by reading the co-ordinate position of the head relative to a given datum when the probe engages the workpiece.

A probe for use in such machines is known to comprise a body supporting a stylus which is generally in the form of a straight rod. For certain types of work, where the measurements may be made primarily in two dimensions it can be desirable for those dimensions to be at least approximately at right angles to the length of the stylus. For example, if the work involves measuring the diameter or centre distance of holes in a horizontal surface, the probe is arranged for the stylus to be vertical. This does not preclude making certain measurements in the vertical direction; for example the depths of the holes can be measured without difficulty. But if the work has to proceed to measuring holes in a vertical surface it is often desirable to index the probe so that the stylus extends horizontally because otherwise it would become difficult to perform such operations as measuring the depth of relatively long holes.

It is an object of this invention to provide an improved method of indexing the probe.

According to this invention, there is provided a method of operating a co-ordinate measuring machine comprising electric motor-driven members supporting a head for three-dimensional motion relative to a fixed structure, an arm connected at one end to the head and having a stylus at the other end, and a pivot connecting said one end of the arm to the head; the method comprising moving the head relative to said fixed structure into a position in which said arm engages said fixed structure at a point on the arm spaced from the centre of said pivot, and further moving the head in the sense causing a moment to be applied to the arm between said point and said centre thereby to turn the arm through a pre-determined angle.

Also according to this invention, there is provided apparatus for performing said method comprising an arm provided at one end with means for the support of a said stylus and provided at the other end with a mounting for connection to a said head, the mounting including two members connected by a pivot enabling relative angular movement of the members on application to the arm of a moment about the axis of the pivot, and means resisting angular movement between said members if said moment is below a given magnitude.

Examples of this invention will now be described with reference to the accompanying drawings wherein:

FIG. 2 is an enlarged detail of FIG. 1 seen in the direction of the arrow II in FIG. 1, FIG. 3 is an enlarged sectional detail of FIG. 2, FIG. 7 is a view in the direction of the arrow VII in FIG. 4.

Figure 1:
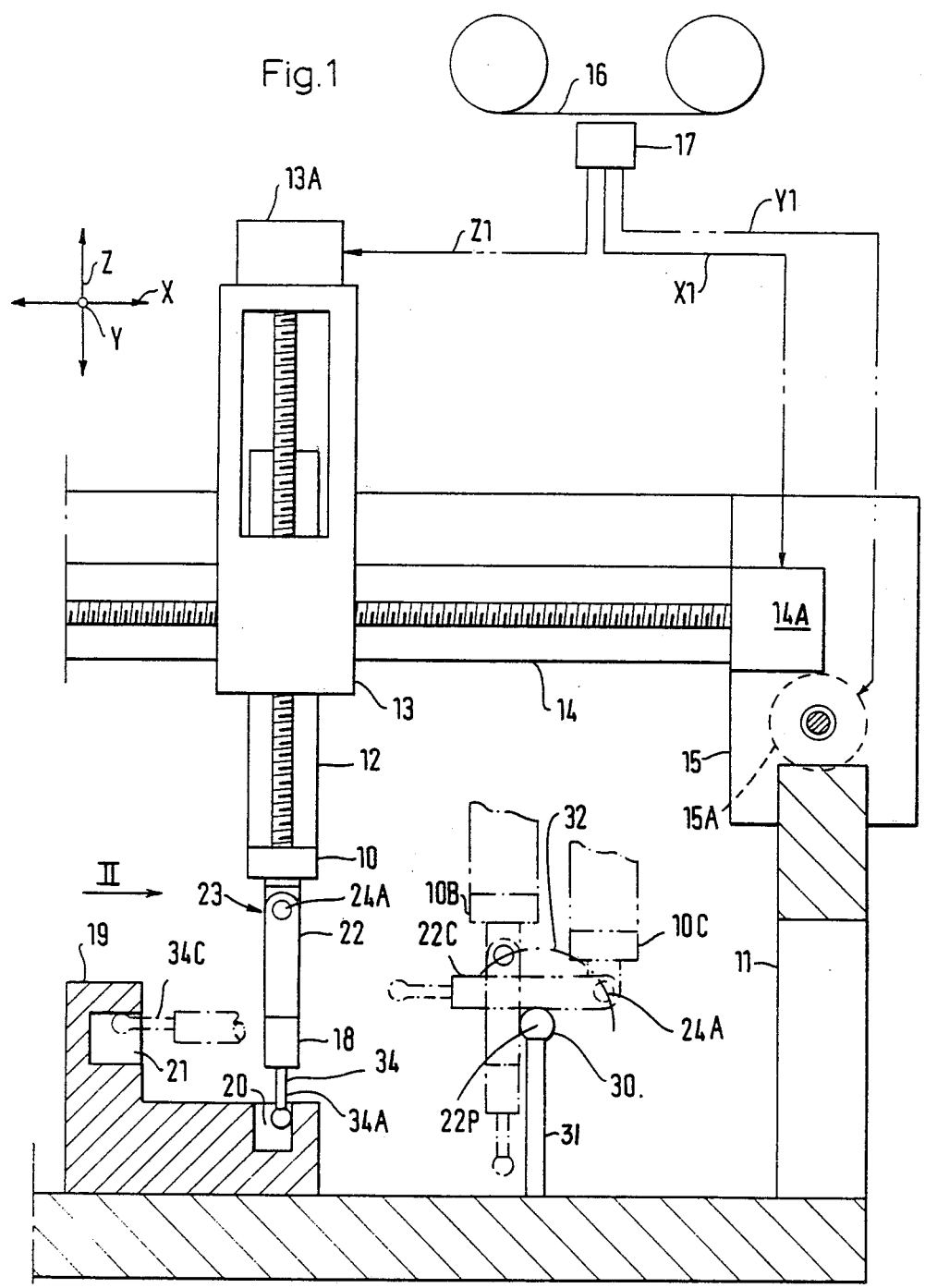
FIG. 1 is an elevation of a co-ordinate measuring machine.
Figure 4:
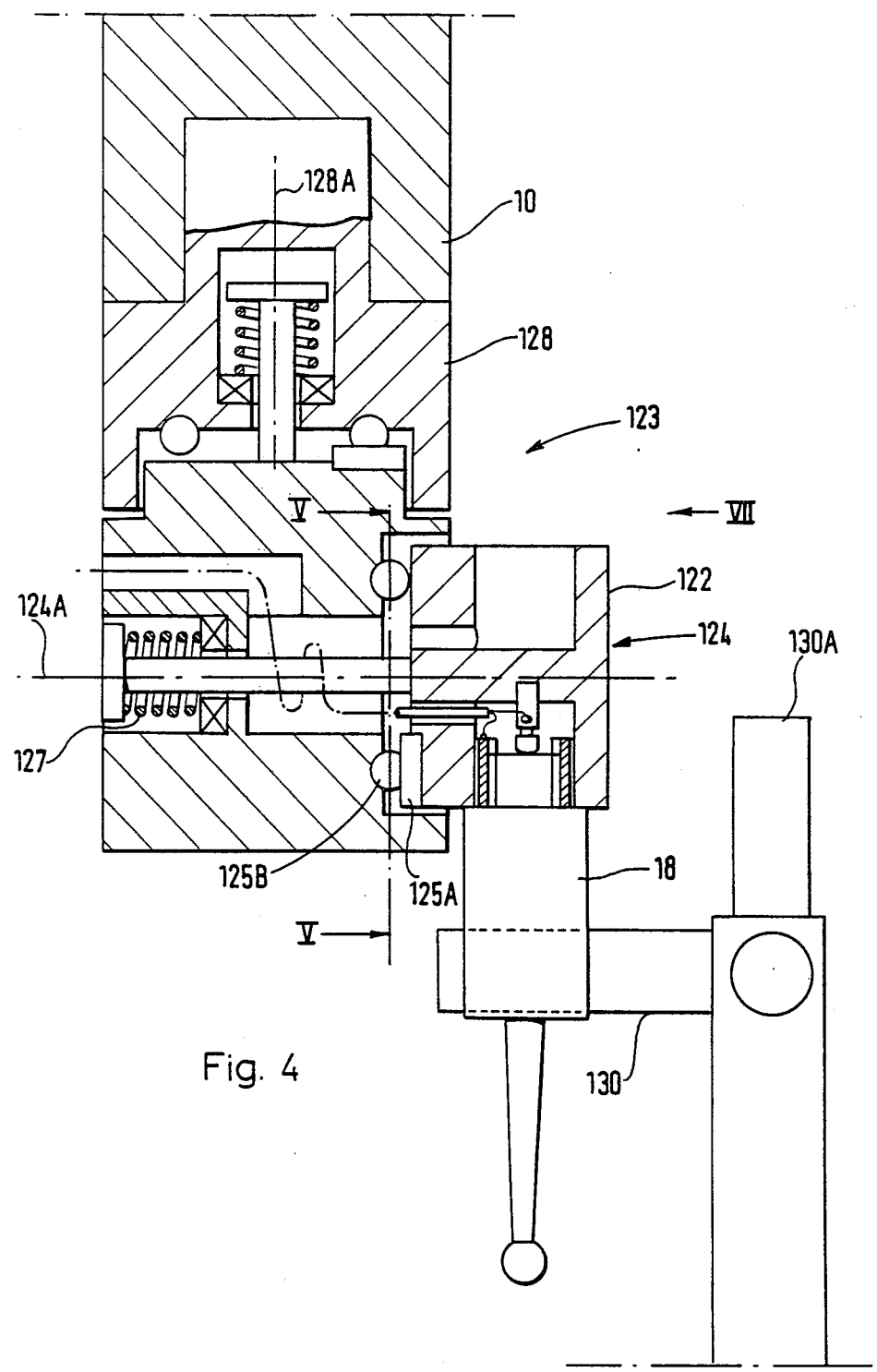
FIG. 4 is an enlarged detail of FIG. 1 but showing a modification.

Referring to FIG. 1 the machine comprises a head 10 supported for three-dimensional motion relative to a fixed structure 11. More particularly, the head is secured to a vertical column 12 supported for longitudinal sliding motion in the vertical or Z direction in a bearing 13 which is supported for horizontal motion in the X direction on a beam 14 which is secured to a bearing 15 supported on said fixed structure for horizontal motion in the Y direction. The members 12,13,15 are driven by respective stepping motors 13A,14A,15A acting through screw and nut gearing in a manner known per se. The motors are controlled by a magnetic three-channel tape 16 acting through a reading head 17 to provide outputs X1,Y1,Z1 for driving the respective motors.

The head 10 has secured thereto a probe 18 having a stylus 34 whereby to engage a workpiece 19 for measuring operations typically including measuring the diameter and depth of a hole 20 arranged on a vertical axis and the diameter and depth of a hole 21 arranged on a horizontal axis. For measuring of the hole 20 it is desirable for the stylus to be in alignment with the vertical direction so as to have a position 34A but for measuring the hole 21 the stylus has to be turned into alignment with a horizontal axis as shown by the position 34C.

For the purpose of said turning, the probe is secured to one end of an arm 22 whose other end is connected to the head 10 by a mounting 23. Referring to FIG. 2 the mounting 23 comprises a pivot 24 having a horizontal axis 24A. The pivot comprises bearings 25A provided on the arm 22 engaging pins 25B provided on a member 26. Free movement of the pivot 24 is inhibited by springs 27 which apply friction as between the bearings 25A and the pins 25B. The member 26 is supported on the head 10 by a pivot 28 having a vertical axis 28A. A spring 29 is provided to frictionally inhibit the motion of the pivot 28.

The arm 22 is pivoted by moving the head into a position 10B in which the arm 22 engages a sphere 30 secured to a pillar 31 in turn secured to the fixed structure 11. For the purposes of this engagement the head is at first positioned so that engagement may take place at a point 22P of the arm spaced from the axis 24A of the pins 24 so that a further movement of the head into the position 10C the engagement with the sphere 30 produces a turning moment on the arm 22 thereby to turn the arm about the axis 24A into the position 22C as shown. Said further movement of the head may be linear in a horizontal direction but it may be desirable for the further movement to be on an arc 32 so that the position of the point 22P does not change unduly.

Inasmuch as the machine is operated by the tape 16 to perform its various measuring movements relative to the workpiece 19, it is, of course, also desirable for the turning of the probe to be effected by signals from the tape 16. This is done by appropriate preparation of the tape to include probe turning commands on the completion of work requiring a vertical orientation of the stylus 34 and before the commencement of work requiring the horizontal orientation. Such preparation of the tape does not differ from preparation for carrying out movements of the head for measuring operations and therefore will be understood by those in the art.

It will be appreciated that the method of turning the probe may be used for any required angle from the vertical, and that the probe may also be turned about the vertical axis 23A by horizontal movement of the head while the arm 22 is itself in a horizontal position. The sphere 30 is otherwise used as a datum for calibrating the probe in a manner known per se and such calibration is normally effected every time the probe has been turned so as to return the probe to the appropriate zero reference condition.

Referring to FIG. 3 the probe comprises a body 33 supporting the stylus 34 which itself has a spherical end 35 for contacting the workpiece. The stylus 34 is supported on the body for tilting motion about spherical supports 36 or vertical motion away from the supports 36. The displacement of the stylus relative to the supports 36 is in opposition to a spring 37 which returns the stylus to the rest position on the supports 36 when the displacing force ceases; such a construction of a probe is well-known per se from U.K. Pat. No. 1,445,977. During a measuring operation the head is moved so that the end 35 of the stylus engages the workpiece at the required location and a signal produced by the probe at the instant of such engagment is used to record the position of the head relative to a pre-determined datum. The force necessary to displace the stylus from the rest position is significantly smaller than any force needed to overcome the friction exerted by the springs 27,29 so that the operation of the probe cannot change its orientation about the axes 24A,28A. For example, a moment of 12.5 gram-centimeter applied to the stylus may be sufficient to tilt the stylus on the supports 36, while the springs 27,29 may be set to require a moment of at least 1250 gram-centimeter to pivot the arm 22.

The springs 27,29 constitute a means resisting angular movement between the members 25A,25B if the moment applied to the arm 22 is of less than a given magnitude. The actual magnitude of the moment is determined experimentally and it has to be sufficiently high to avoid spurious movement of the arm e.g. under the inertia of the arm when the movement of the head is started or stopped. The required moment can be changed easily by changing the springs 27,29 or tightening nuts 27A,29A which hold the springs in compression.

Figure 5:
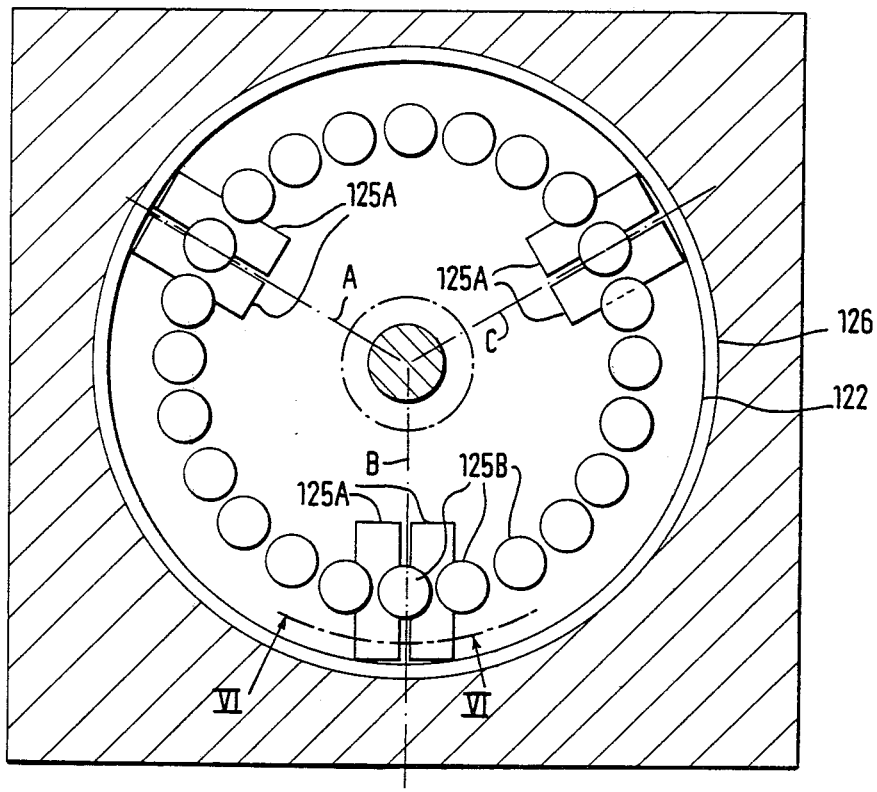
FIG. 5 is a section on the line V—V in FIG. 4.
Figure 6:
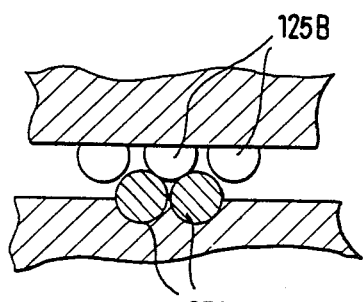
FIG. 6 is a section on the line VI—VI in FIG. 5.

In a modification (FIGS. 4 to 7) the probe 18 is connected to the head 10 by a mounting 123 including a pivot 124 having a horizontal axis 124A and a pivot 128 having a vertical axis 128A. The pivot 124 comprises a member 122 to which are secured three pairs of cylindrical supports 125A arranged on axes A,B,C (FIG. 5) spaced equally around the axis 124A. A spring 127 biases the member 122 into engagement with a member 126 to which is secured an annular array of spherical supports 125B, each pair of cylindrical supports 125A engaging one of the spherical supports 125B between them (FIG. 6). Each pair of supports 125A constitute a pair of convergent surfaces both engaged by the relevant spherical support, and the three sets of supports 125A,125B co-operate to locate the member 122 positively against displacement except insofar as permitted by the spring 127. The member 122 is pivotable about the axis 124A by being indexed from one set of three spherical supports 125B to the next such set, the spring 127 being slightly compressed as the cylindrical supports ride from one set of spherical supports to the next. The moment necessary to turn the member 122 must be sufficient to enable the cylindrical supports to ride over the spherical supports against the bias of the spring 127. The indexing of the member 122 is limited to steps corresponding to the pitch of the spherical member, e.g. the indexing is limited to steps of 15° as distinct from indexing through any angle possible with the example shown in FIGS. 1 to 3.

The member 122 constitutes an arm, either alone or together with the body 33 of the probe 18, capable of pivoting about the axis 124A by engagement with stationary structure represented, in this example, by a horizontal rod 130. FIG. 7 shows how the member 122 is turned through 120° by the head 10 being moved through the arc 132. The member 122 may support further probes 18A,18B as may be required for different types of measuring operation and the operation of turning the member may be carried out in order to bring any one of the different probes 18,18A,18B into a given operating position, e.g. into the vertically downward position.

During use of the pivot 124 the pivot 128 plays no part, but when it is required to turn the probe 18 about the vertical axis 128A, the probe is first brought into the horizontal position and a rod 130A is used as stationary structure to turn the probe about the axis 128A. The pivot 128 connects the member 126 to the head 10 by an arrangement of cylindrical and spherical supports the same as described in respect of the pivot 124.

In either of the examples described the fixed structure necessary for turning the probe may be the workpiece itself. In other words, in a suitable case, the arm 22 or members 122 may be driven against an edge of the workpiece to effect the turning of the probe.

I claim:

1. A device for mounting a probe in a co-ordinate positioning machine, the probe comprising an arm having a supported end and a free end which, in use, cooperates with a surface of a work-piece to be measured for sensing the position of said surface, the device comprising: a first member adapted to be secured to the machine, a second member to which said supported end of the arm is connected, the members having an axis, one of the members having a group of at least three first support elements arranged about said axis, the other member having a group of only three second support elements arranged about said axis, the members being relatively rotatable about said axis to establish alignment between said three second elements and a selected three of the first elements, the first elements having seat surfaces, the second elements having seat surfaces confronting the seat surfaces of the first elements when the alignment is established, the members being movable relatively axially to establish engagement between confronting ones of said surfaces of the first and second elements, the surfaces of the elements of one of said groups defining pairs of convergent surfaces on which the surfaces of the elements of the other group are seatable during the engagement thereby to locate the members positively one on the other and determine the angular and radial relationship of the members, and the surfaces of the elements of one of said groups are straight at least substantially radially in respect of said axis, and the surfaces of the elements of the other group are convex in two planes which are perpendicular to each other.

2. A device for mounting a tool in a machine, the tool having a supported end and a free end which, in use, performs an operating function, said device comprising: a first member adapted to be secured to the machine, a second member to which said supported end is connected, the members having an axis, one of the members having a group of at least three first support elements arranged about said axis, the other member having a group of only three second support elements arranged about said axis, the members being relatively rotatable about said axis to establish alignment between said three second elements and a selected three of the first elements the first elements having seat surfaces, the second elements having seat surfaces confronting the seat surfaces of the first elements when the alignment is established, the members being movable relatively axially to establish engagement between confronting ones of said surfaces of the first and second elements, the surfaces of the elements of one of said groups defining pairs of convergent surfaces on which the surfaces of the elements of the other group are seatable during the engagement thereby to locate the members positively one on the other and determine the angular and radial relationship of the members, and the surfaces of the elements of one of said groups are straight at least substantially radially in respect of said axis, and the surfaces of the elements of the other group are convex in two planes which are perpendicular to each other.

3. An indexing device comprising two members and having an axis, one of the members having a group of at least three first support elements arranged about said axis, the other member having a group of only three second support elements arranged about said axis, the members being relatively rotatable about said axis to establish alignment between said three second elements and a selected three of the first elements, the first elements having seat surfaces, the second elements having seat surfaces confronting the seat surfaces of the first elements when the alignment is established, the members being movable relatively axially to establish engagement between confronting ones of said surfaces of the first and second elements, the surfaces of the elements of one of said groups defining pairs of convergent surfaces on which the surfaces of the elements of the other group are seatable during the engagement thereby to locate the members positively one on the other and determine the angular and radial relationship of the members, and the surfaces of the elements of one of said groups are straight at least substantially radially in respect of said axis and the surfaces of the elements of the other group are convex in two planes which are perpendicular to each other.

4. A device according to any one of claims 1, 2 or 3 wherein said straight surfaces are cylindrical.

5. A device according to any one of claims 1, 2 or 3 wherein said convex surfaces are spherical.

6. A device according to any one of claims 1, 2 or 3 wherein said straight surfaces are arranged in pairs of cylindrical surfaces, and said convex surfaces are spherical and are each seatable on a said pair of cylindrical surfaces.

* * * * *